United States Patent
Fouquet et al.

(10) Patent No.: US 10,612,186 B2
(45) Date of Patent: Apr. 7, 2020

(54) METHOD FOR PRODUCING A CURVED HONEYCOMB STRUCTURE MADE FROM COMPOSITE MATERIAL

(71) Applicant: HERAKLES, Le Haillan (FR)

(72) Inventors: Stéphanie Fouquet, Saint Medard en Jalles (FR); Sébastien Jimenez, Bordeaux (FR); Eric Philippe, Merignac (FR); François Charleux, Bordeaux (FR)

(73) Assignee: SAFRAN CERAMICS, Le Haillan (FR)

( * ) Notice: Subject to any disclaimer, the term of this patent is extended or adjusted under 35 U.S.C. 154(b) by 259 days.

(21) Appl. No.: 14/764,396

(22) PCT Filed: Jan. 29, 2014

(86) PCT No.: PCT/EP2014/051697
§ 371 (c)(1),
(2) Date: Jul. 29, 2015

(87) PCT Pub. No.: WO2014/118215
PCT Pub. Date: Aug. 7, 2014

(65) Prior Publication Data
US 2015/0361612 A1    Dec. 17, 2015

(30) Foreign Application Priority Data
Jan. 29, 2013   (FR) ...................... 13 50722

(51) Int. Cl.
*D06M 10/06*    (2006.01)
*D03D 25/00*    (2006.01)
(Continued)

(52) U.S. Cl.
CPC ............. *D06M 10/06* (2013.01); *B29C 70/24* (2013.01); *B29D 99/0089* (2013.01);
(Continued)

(58) Field of Classification Search
CPC ... D06M 10/06; D06M 2101/40; B29C 70/24; B29D 99/0089; C04B 35/571;
(Continued)

(56) References Cited

U.S. PATENT DOCUMENTS 2,668,327 A    2/1954 Steele
4,772,502 A    9/1988 Okura
(Continued)

FOREIGN PATENT DOCUMENTS

EP    0 573 353 A1    12/1993
FR    2 923 748 A1    5/2009
GB    2 314526 A    1/1998

OTHER PUBLICATIONS

International Search Report as issued in International Patent Application No. PCT/EP2014/051697, dated Mar. 14, 2014.
(Continued)

*Primary Examiner* — Matthew J Daniels
*Assistant Examiner* — Yunju Kim
(74) *Attorney, Agent, or Firm* — Pillsbury Winthrop Shaw Pittman LLP

(57) ABSTRACT

A method of fabricating a curved cellular structure includes making an expandable fiber structure by multilayer weaving between layers of warp yarns and layers of weft yarns, the structure having zones of non-interlinking extending in the thickness of the structure, the non-interlinking zones spaced apart from one another by portions of interlinking between layers of weft yarns, the portions of interlinking offset by one or more weft yarns in a direction parallel to the direction of the layers of weft yarns between each series of these planes; impregnating the fiber structure with a resin; expanding the fiber structure on support tooling to form a cell in the fiber structure at each zone of non-interlinking, the tooling also presenting a curved shape corresponding to the shape of (Continued)

the cellular structure that is to be fabricated; and polymerizing the resin of the fiber structure to form a curved cellular structure.

15 Claims, 17 Drawing Sheets

(51) Int. Cl.
*C04B 35/571* (2006.01)
*C04B 35/80* (2006.01)
*D03D 11/02* (2006.01)
*B29C 70/24* (2006.01)
*B29D 99/00* (2010.01)
*C04B 35/622* (2006.01)
*B29B 11/16* (2006.01)
*D06M 101/40* (2006.01)

(52) U.S. Cl.
CPC ...... *C04B 35/571* (2013.01); *C04B 35/62218* (2013.01); *C04B 35/806* (2013.01); *D03D 11/02* (2013.01); *D03D 25/005* (2013.01); *C04B 2235/483* (2013.01); *C04B 2235/5244* (2013.01); *C04B 2235/5252* (2013.01); *C04B 2235/6027* (2013.01); *C04B 2235/614* (2013.01); *C04B 2235/616* (2013.01); *D06M 2101/40* (2013.01); *D10B 2505/02* (2013.01)

(58) Field of Classification Search
CPC ............ C04B 35/62218; C04B 35/806; C04B 2235/483; C04B 2235/5244; C04B 2235/5252; C04B 2235/6027; C04B 2235/614; C04B 2235/616; D03D 11/02; D03D 25/005; D10B 2505/02; B32B 5/26
USPC .............. 264/29.1; 416/241; 156/197, 89.22; 442/239
See application file for complete search history.

(56) References Cited

U.S. PATENT DOCUMENTS

| | | | |
|---|---|---|---|
| 5,415,715 | A | 5/1995 | Delage et al. |
| 5,514,445 | A | 5/1996 | Delage |
| 5,893,955 | A | 4/1999 | Rousseau |
| 5,912,442 | A | 6/1999 | Nye et al. |
| 2009/0142980 | A1* | 6/2009 | Chen ................... D03D 1/0058 442/239 |
| 2010/0015428 | A1 | 1/2010 | Philippe |
| 2011/0311368 | A1 | 12/2011 | Coupe |

OTHER PUBLICATIONS

Non-Final Office Action as issued in U.S. Appl. No. 14/764,052, dated Aug. 15, 2016.

International Preliminary Report on Patentability and the Written Opinion of the International Searching Authority as issued in International Patent Application No. PCT/EP2014/051697, dated Aug. 4, 2015.

* cited by examiner

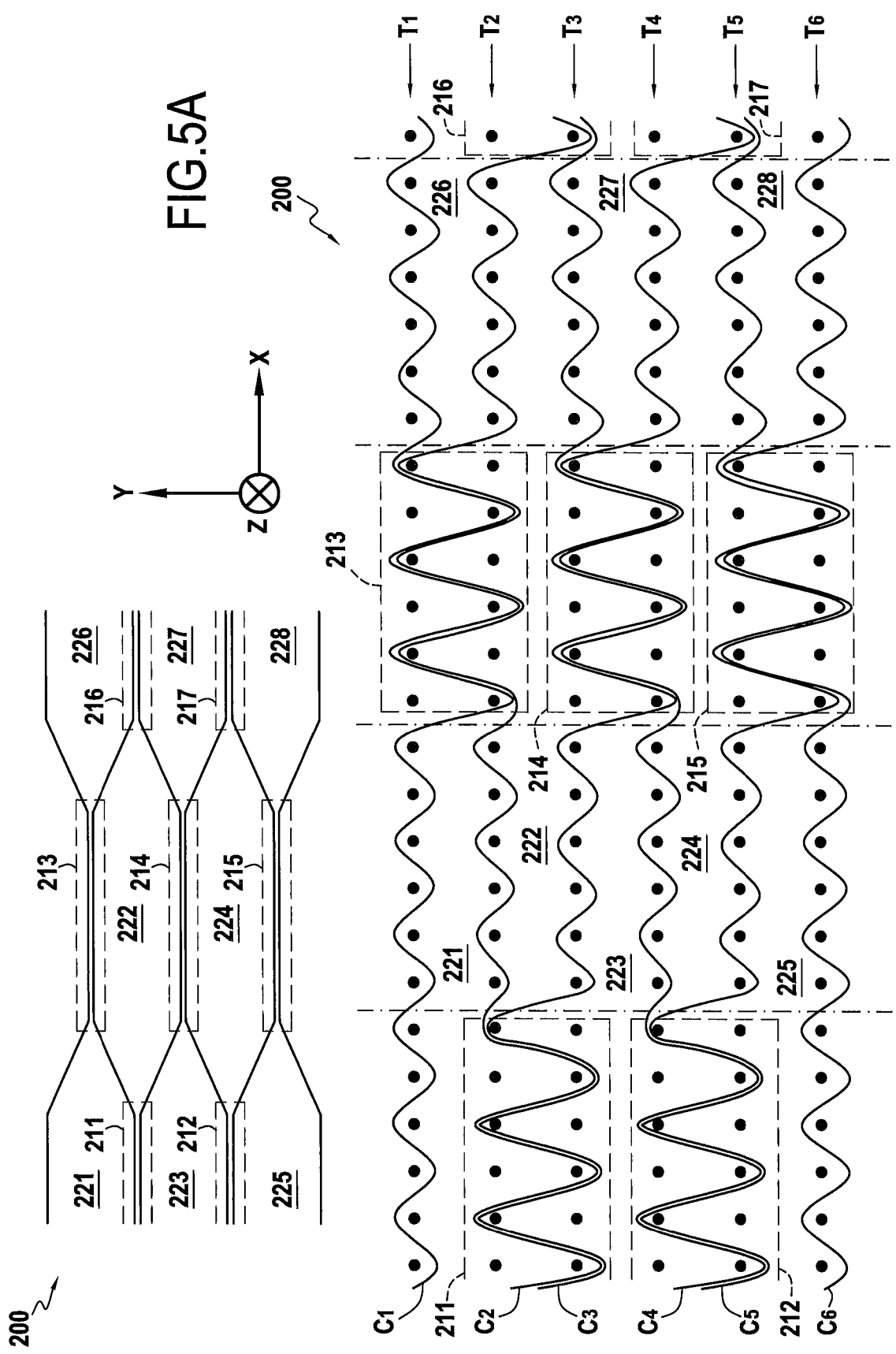

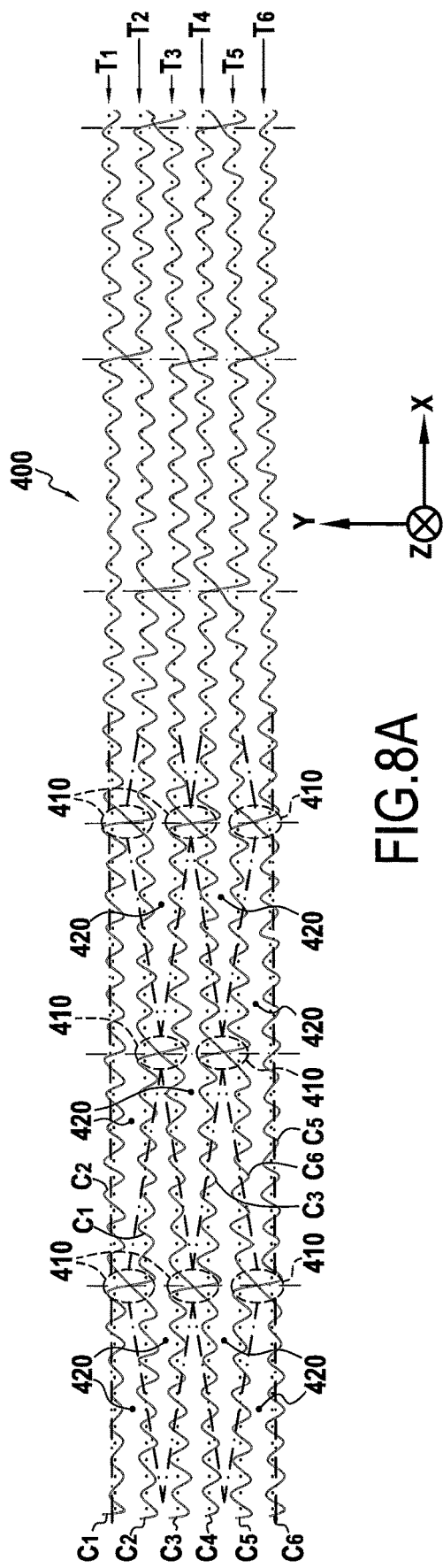
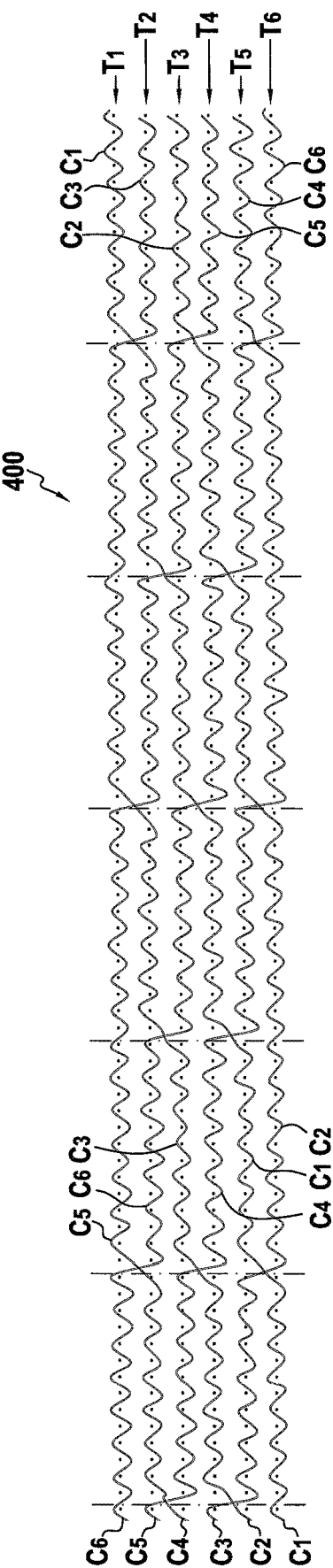
FIG.8A
FIG.8B

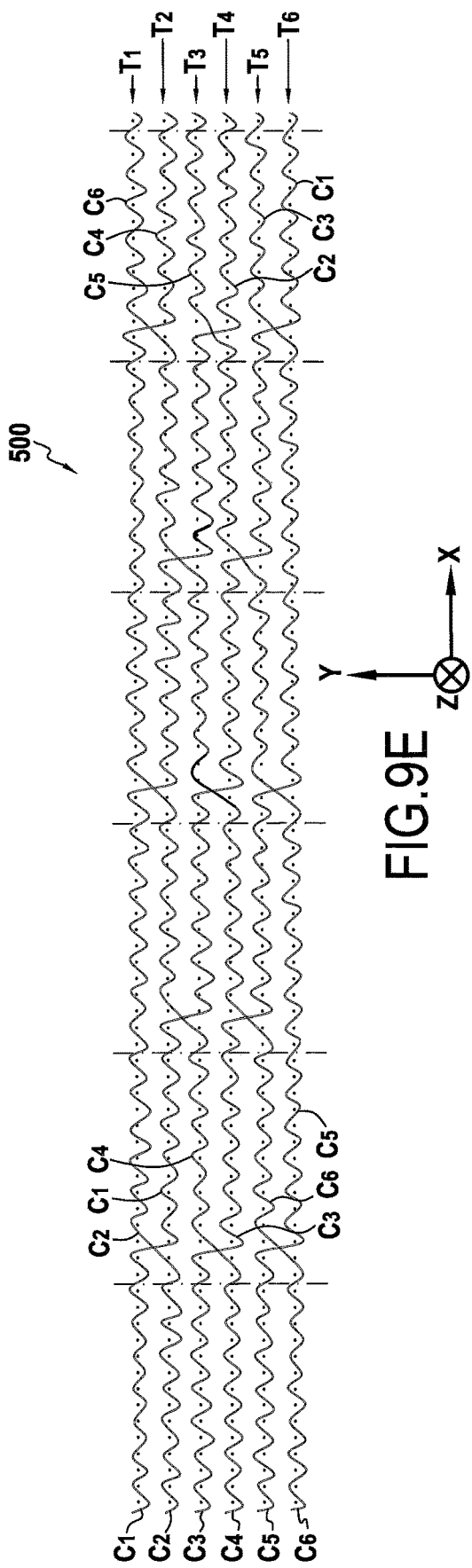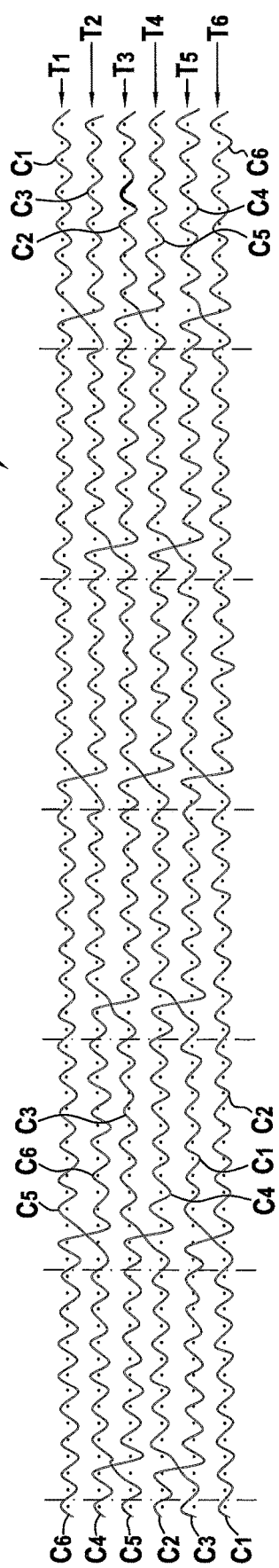
FIG.9E
FIG.9F

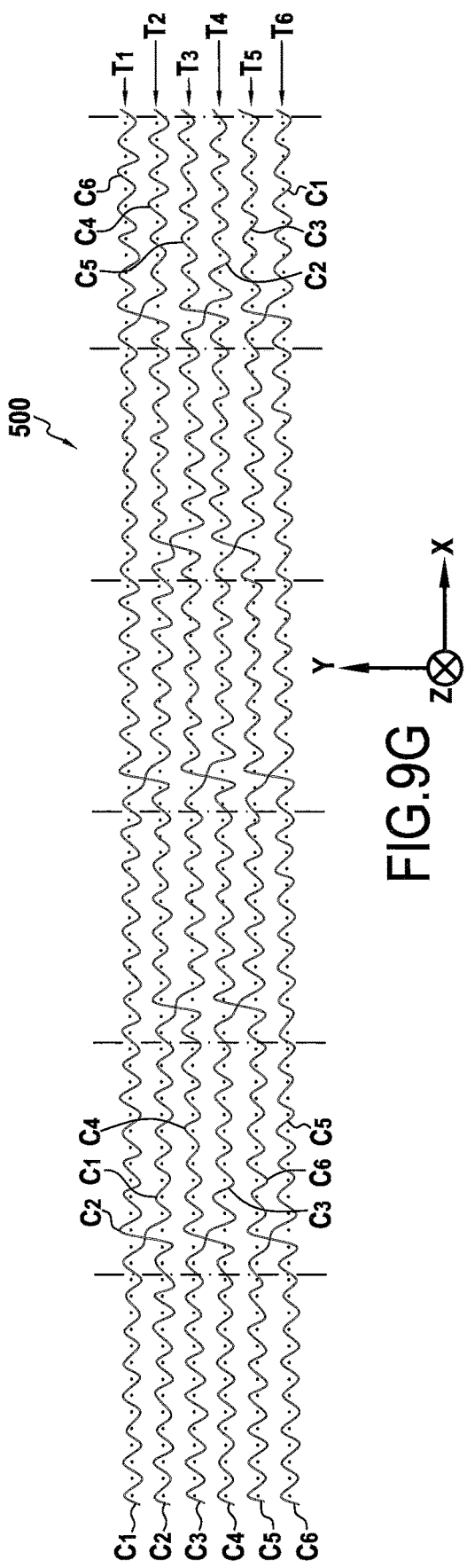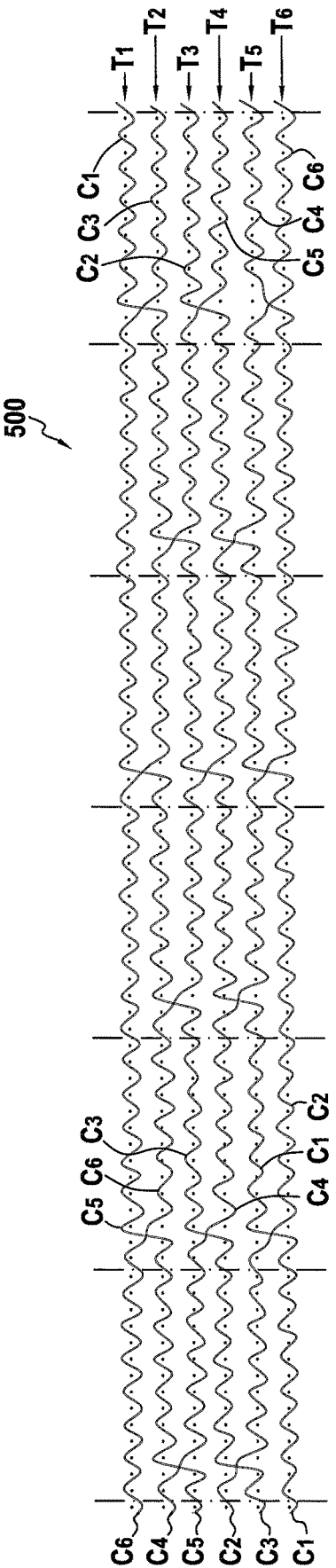
FIG.9G
FIG.9H

METHOD FOR PRODUCING A CURVED HONEYCOMB STRUCTURE MADE FROM COMPOSITE MATERIAL

CROSS REFERENCE TO RELATED APPLICATIONS

This application is the U.S. National Stage of PCT/EP2014/051697 filed Jan. 29, 2014, which in turn claims priority to French Application No. 1350722 filed Jan. 29, 2013. The contents of both applications are incorporated herein by reference in their entirety.

BACKGROUND OF THE INVENTION

The present invention relates to the general field of cellular structures or cellular bodies that are used for example in sound attenuation panels for reducing the noise produced by aviation gas turbines or combustion chambers, or in reducing the weight of structural elements (stiffeners) for assemblies of the sandwich type.

These panels are typically constituted by a multi-perforated surface panel that is permeable to the soundwaves that it is desired to attenuate, and a solid reflecting panel, with a cellular structure or cellular body, such as a honeycomb, being arranged between those two walls. In well-known manner, the panels form Helmholtz type resonators that perform attenuation over a certain frequency range of soundwaves produced in the duct.

The cellular structure may be made of a metal material, as described in Documents U.S. Pat. No. 5,912,442 and GB 2 314 526, or out of composite material, i.e. a material comprising fiber reinforcement densified by a matrix, which is lighter than a metal material.

Document U.S. Pat. No. 5,415,715 discloses making honeycomb structures out of a composite material, starting from a fiber structure that is expandable. In that document, the fiber structure may be made in particular by stacking and bonding together in staggered manner two-dimensional plies of fabric so as to form a texture. The connections between the plies are made along parallel strips arranged in staggered manner and formed by adhesive or by stitching. The stack of plies is then cut into segments, with each segment then being stretched in a direction normal to the faces of the plies so as to obtain cellular structures by deformation.

In a variant embodiment described in Document U.S. Pat. No. 5,415,715, two-dimensional plies are superposed and needled together in order to form a texture. Slot-shaped cuts are then made in a staggered configuration in the texture, e.g. by a waterjet or by laser, with dimensions and at locations that define the dimensions and the shapes of the cells. After making the cuts, the texture is stretched in the direction perpendicular to the cutting planes so as to obtain a cellular structure by deformation.

Nevertheless, although. that type of fiber structure is well adapted to making cellular structures that are plane, it is found to be very difficult to use when it is desired to make cellular structures that are curved in shape. The deformation to obtain a curved shape gives rise to zones of tension in the fiber structure. When the fiber structure is made from a stack of two-dimensional plies as described above, the plies can become separated in the vicinity of these zones of tension or they can deform in non-uniform manner so as to prevent a regular cellular structure being obtained.

Furthermore, making expandable fiber textures in the manner described above requires a large number of manual operations, which are not compatible with industrial production.

There therefore exists the need to have a solution that is reliable and inexpensive, and that makes it possible to fabricate cellular structures out of composite material and of a shape that is curved.

OBJECT AND SUMMARY OF THE INVENTION

To this end, the present invention provides a method of fabricating a curved cellular structure, the method comprising the following steps:

making an expandable fiber structure having zones of non-interlinking extending in the thickness of the fiber structure, the zones of non-interlinking being spaced apart from one another by portions of interlinking;

impregnating the fiber structure with a resin that is a precursor for a determined material, with impregnation optionally being followed by drying or pre-curing;

expanding the fiber structure on support tooling so as to form a cell in the fiber structure at each zone of non-interlinking, the tooling also presenting a curved shape corresponding to the shape of the cellular structure that is to be fabricated; and polymerizing the resin of the fiber structure so as to form a curved cellular structure having a plurality of cells;

the method being characterized in that the fiber texture is made by multilayer weaving between a plurality of layers of warp yarns and a plurality of layers of weft yarns, repeating a series of successive weave planes each having portions of interlinking in which at least one warp yarn interlinks weft yarns from at least two adjacent layers of weft yarns, the portions of interlinking being offset by one or more weft yarns in a direction parallel to the layers of weft yarns between each series of weave planes.

Thus, in accordance with the method of the invention, a cellular structure is made from an expandable fiber structure that is obtained by weaving, thus enabling it to have mechanical strength imparted thereto that is greater than the strength of an expandable structure obtained by stacking plies. The fiber structure of the invention presents good cohesion at all points and makes it easy to obtain a uniform cellular structure after expansion, even when it is shaped on tooling presenting a curved shape. By making the fiber structure by weaving, losses of material are minimized compared with a structure obtained by stacking plies.

Furthermore, in the method of the invention, a cellular structure is obtained in which the woven reinforcement has weft yarns and warp yarns forming an angle relative to the axis of the cells, thereby making it possible to achieve better deformability for following curved shapes by reducing zones of tension in the fiber structure while it is being shaped.

According to a particular characteristic, the fiber structure is woven by repeating a series of two successive weave planes, each having interlinking portions in which at least one warp yarn interlinks weft yarns of at least two adjacent layers of weft yarns, the interlinking portions being offset by two weft yarns in a direction parallel to the direction of the layers of weft yarns between each series of weave planes so as to orient the yarns of the warp layers and the yarns of the weft layers in a direction forming an angle of 45° relative to the axis of each cell, thus enabling the fiber structure to be deformed to a greater extent while it is being expanded, thereby facilitating good shaping on a warped surface.

In a second aspect of the method of the invention, the fiber structure is made by three-dimensional weaving by multilayer interlock weaving, thereby further reinforcing the mechanical strength of the fiber structure and consequently the mechanical strength of the resulting cellular structure.

In a third aspect of the method of the invention, the thickness of the walls of the cells of the cellular structure that is to be fabricated is adjusted as a function of the number of layers of warp yarns woven in the interlinking portions.

The fiber structure may be made from silicon carbide fibers, and the resin used for impregnation of the fiber structure may be a ceramic-precursor resin.

The fiber structure may also be made from carbon fibers, with the resin used for impregnating the fiber structure being a carbon-precursor resin of phenolic type.

In a fourth aspect of the method of the invention, it further includes a step of pyrolyzing the resin in order to transform said resin into ceramic.

In a fifth aspect of the method of the invention, it further includes a step of densifying the cellular structure.

In a sixth aspect of the method of the invention, after the impregnation step, possibly followed by a pre-curing step, and before the step of expanding and polymerizing the fiber structure, the method includes a step of cutting to one or more determined dimensions of the cellular structure.

In a seventh aspect of the method of the invention, it includes a step of making a fiber structure by multilayer weaving between a plurality of layers of warp yarns and a plurality of layers of weft yarns, the fiber structure having zones of non-interlinking extending in the thickness of the substrate, the zones of non-interlinking being spaced apart from one another by portions of interlinking between a plurality of layers of weft yarns, the method further including, after a step of impregnating the fiber structure with a resin that is a precursor for a determined material possibly followed by pre-curing, a step of cutting at least one strip from the fiber structure so as to obtain the expandable fiber structure, each strip being cut out with a determined width corresponding to the height of the cells to be made.

BRIEF DESCRIPTION OF THE DRAWINGS

Other characteristics and advantages of the invention appear from the following description of particular implementations of the invention given as non-limiting examples, and with reference to the accompanying drawings, in which:

FIGS. 5A and 5B are respective enlarged views of two successive weave planes of a fiber structure that is expandable in accordance with another implementation of the invention;

FIGS. 8A to 8D are fragmentary enlarged views of successive weave planes of an expandable fiber structure obtained by 3D interlock weaving in accordance with another implementation of the invention;

FIGS. 9A to 9H show weave planes enabling a fiber structure to be made of the same type as the fiber structure of FIGS. 8A and 8D, but in which the weft and warp yarns are oriented at 45° relative to the axis of the cells in accordance with another implementation of the invention.

DETAILED DESCRIPTION OF AN IMPLEMENTATION

The invention applies in general to making cellular structures or cellular bodies of the honeycomb type presenting a shape that is curved in one or more directions and that is made out of composite material, i.e. out of a material comprising fiber reinforcement densified by a matrix. The cellular structure of the invention may be used in particular in sound attenuation systems and/or as a weight-reducing structural element (a stiffener) in a sandwiched type assembly.

The cellular structure of the invention may be made more particularly, but not exclusively, out of a thermostructural composite material, i.e. a composite material having good mechanical properties and the ability to conserve these properties at high temperature. Typical thermostructural composite materials are carbon/carbon (C/C) composite materials formed by carbon fiber reinforcement densified with a carbon matrix, and ceramic matrix composite (CMC) materials formed by refractory fiber reinforcement (made of carbon or of ceramic) densified by a matrix that is ceramic, at least in part. Examples of CMCs are C/SiC composite materials (carbon fiber reinforcement and silicon carbide matrix), C/C—SiC composite materials (carbon fiber reinforcement and matrix including both a carbon phase, generally closer to the fibers, and also a silicon carbide phase), and SiC/SiC composite materials (reinforcing fibers and matrix both made of silicon carbide). An interphase layer may be interposed between the reinforcing fibers and the matrix in order to improve the mechanical strength of the material.

Figure 1:
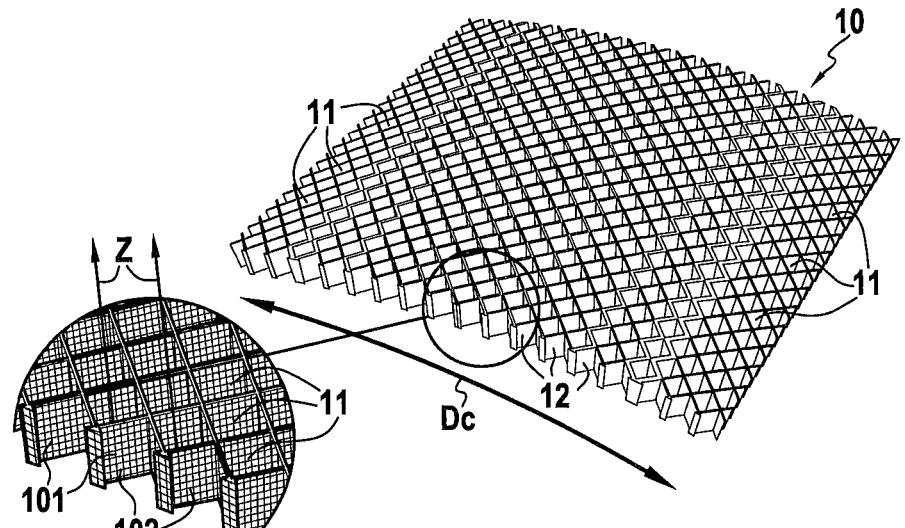
FIG. 1 is a diagrammatic perspective view of a cellular structure curved in accordance with an implementation of the invention.

FIG. 1 shows a cellular structure 10 having a plurality of cells 11 defined by walls 12, each cell 11 extending vertically along a Z axis referred to below as the "cell axis". In the embodiment shown in FIG. 1, the cells 11 are lozenge-shaped. Nevertheless, the cells of the cellular structure of the invention may present a variety of geometrical shapes, such as shapes that are hexagonal, square, of the Flexicore® type, etc. The cellular structure 10 presents a shape that is curved in a direction Dc. In the presently-described example, the cellular structure 10 presents the shape of a portion of a cylinder. Nevertheless, the cellular structure of the invention could present other shapes, such as for example: a frusto-conical shape; and/or one or more curves in different directions.

In accordance with the invention, the fabrication of the cellular structure begins by forming an expandable fiber structure that is to form the fiber reinforcement of the cellular structure, the fiber structure being obtained by multilayer or three-dimensional (3D) weaving performed on a Jacquard type loom having a bundle of warp yarns that are arranged thereon in a plurality of layers of yarns, the warp yarns being interlinked by weft yarns, and vice versa.

In the specification and in the drawings, by convention and for reasons of convenience, it is stated and shown that it is the warp yarns that are deflected from their paths in order to link the weft yarns of a weft layer or of a plurality of weft layers. Nevertheless, interchanging roles between warp and weft is possible and should be considered as being covered by the present invention.

Figure 2:
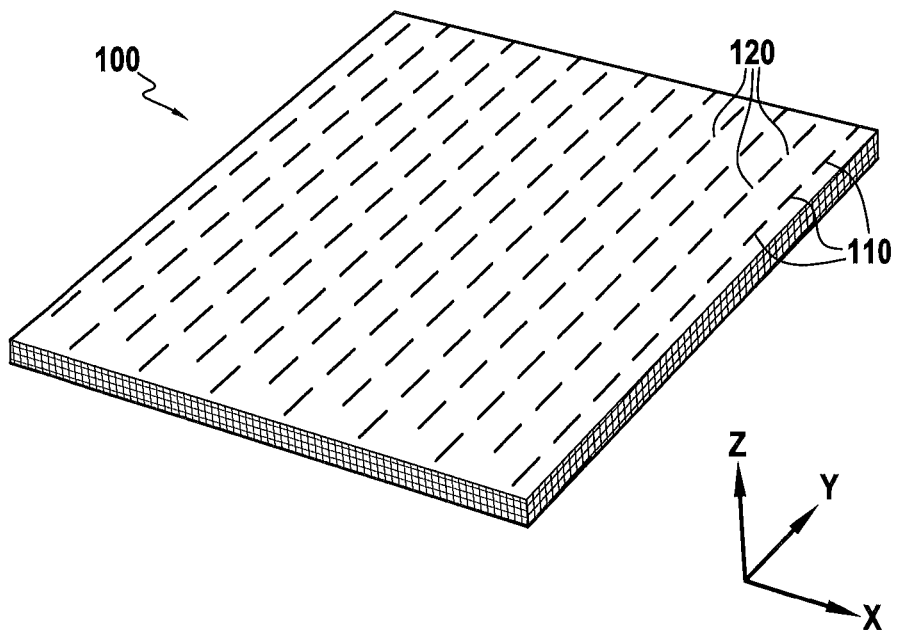
FIG. 2 is a diagrammatic view of a fiber structure that is expandable in accordance with an implementation of the invention.

FIG. 2 shows an expandable fiber structure 100 for constituting the fiber reinforcement of the cellular structure 10. The structure 100 has a plurality of zones 110 of non-interlinking that extend through the thickness of the fiber structure and that are spaced apart from one another by interlinked portions 120. As described below in detail, the interlinked portions correspond to portions of the fiber structure where the layers of warp yarns are interlinked by weft yarns, these portions then corresponding to junction portions between the walls of cells in the cellular structure.

Figure 3A:
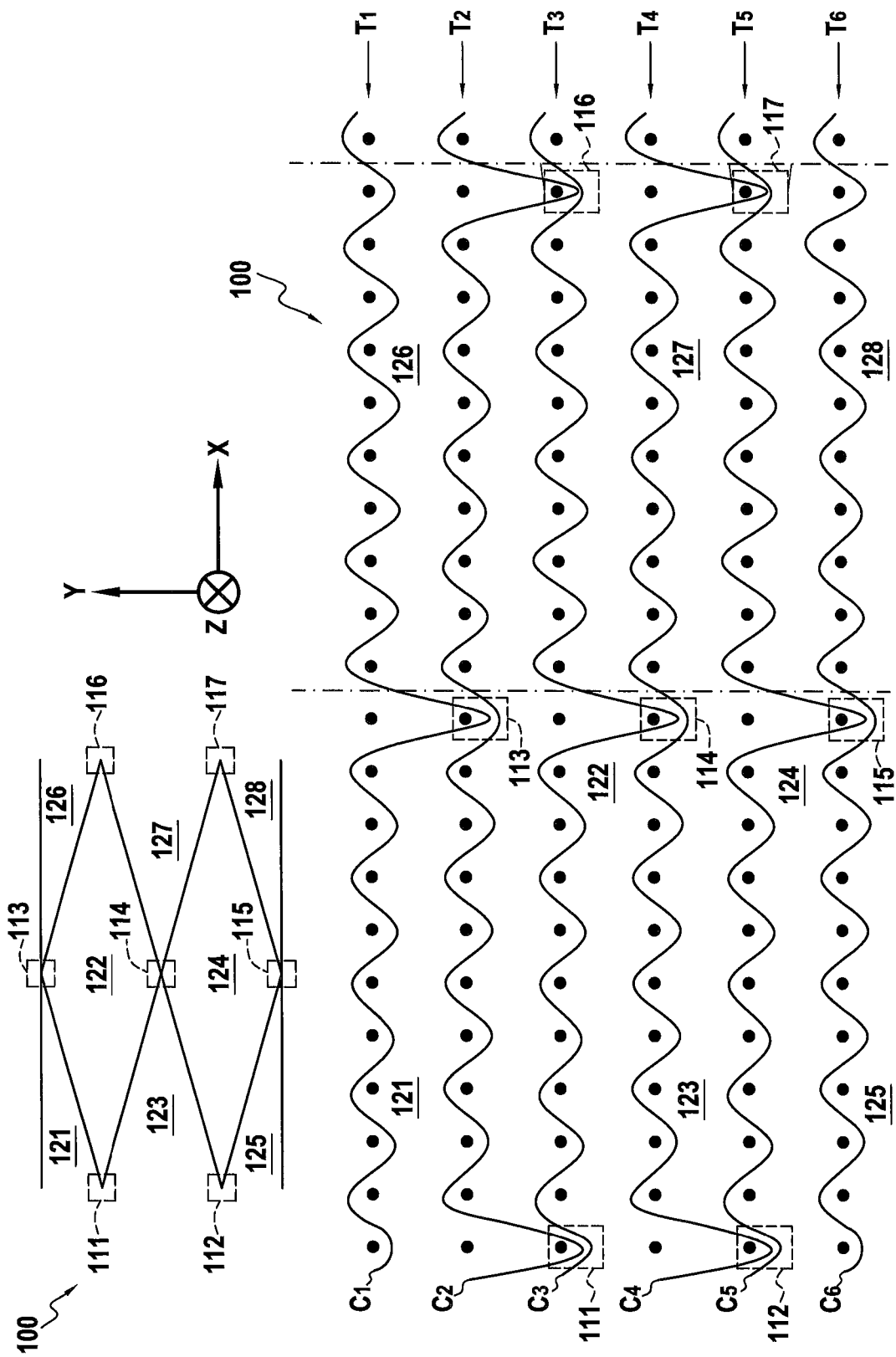
FIGS. 3A and 3B are respective enlarged views on two successive weave planes of a fiber structure that is expandable in accordance with an implementation of the invention.
Figure 3B:
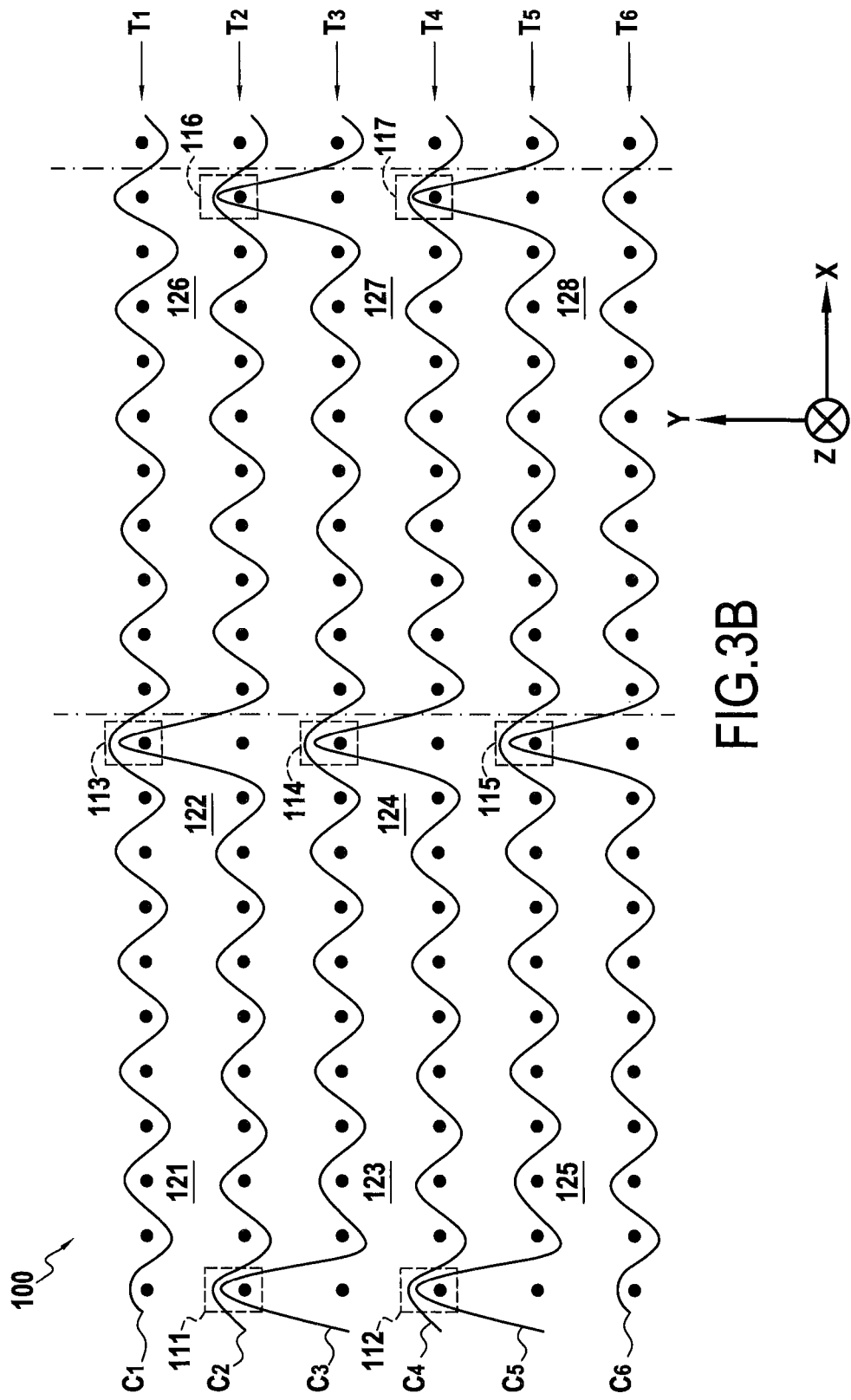

One technique for multilayer weaving of the fiber structure 100 is shown diagrammatically in FIGS. 3A and 3B which are respective enlarged views of two successive weave planes of a weave of the multi-plain type, the weft yarns being shown in section. In this example, the structure 100 comprises six layers of weft yarns T1 to T6 extending in the Z direction corresponding to the axis of the cells of the cellular structure (FIG. 1). In FIGS. 3A and 3B, each layer of weft yarns is interlinked by warp yarns C1 to C6, each belonging to a respective one of the layers of warp yarns. The thickness of the fiber structure, and consequently the height of the cells formed subsequently by expanding the structure 100, extends in the Z direction and is determined by the length of the weft yarns woven together by the warp yarns, i.e. the number of repeats of the planes shown in FIGS. 3A and 3B. The length and the width of the structure 100 are defined respectively by the number of weft yarns per layer (X direction) and by the number of layers of warp yarns that are woven (Y direction).

For simplification purposes, six layers of warp yarns and six layers of weft yarns are shown. Naturally, depending on the dimensions (width and thickness) of the fiber structure that it is desired to obtain, the structure may be made with numbers of layers of warp yarns and of weft yarns that are greater, in particular in order to increase the number of cells in the Y direction of the fiber structure. Still for the purposes of concision, only 22 weft yarns are shown in order to show how two adjacent lozenge-shaped cells are made, as shown in FIG. 3A. Naturally, the number of weft yarns per layer may be greater in order to increase the size of the cells in the X direction of the fiber structure.

The interlinked portions 111 to 117 are made between the yarns of two adjacent layers of weft yarns. These interlinked portions define between them zones of non-interlinking 121 to 128, each forming part or all of a cell once the fiber structure has been expanded.

Once the expandable fiber structure 100 has been made, it is impregnated with a liquid composition that contains an organic precursor of a determined material, e.g. a ceramic. For this purpose, the fiber texture is immersed in a bath containing the resin, and usually a solvent for the resin. After draining, the texture is dried in a stove. Drying must be performed at a temperature that is moderate in order to maintain sufficient deformability for the fiber texture. Other known impregnation techniques may be used, such as passing the fiber texture through a continuous impregnator, impregnation by infusion, or indeed impregnating by resin transfer molding (RTM).

The organic precursor is usually present in the form of a polymer, such as a resin, possibly diluted in a solvent. By way of example, liquid precursors for ceramic (when using a CMC composite material), and in particular for SiC, may be resins of the polycarbosilane (PCS), polysiloxane (PSX), polytitanocarbosilane (PTCS), or polysilazane (PSZ) type.

The fiber structure can then be subjected to drying or to pre-curing (pre-polymerization).

At this stage, the fiber structure can be cut, e.g. by a jet of water under pressure or by laser, in order to be fitted to one or more determined dimensions. The height, the length, and/or the width of the final cellular structure can thus be adjusted.

Figure 4:
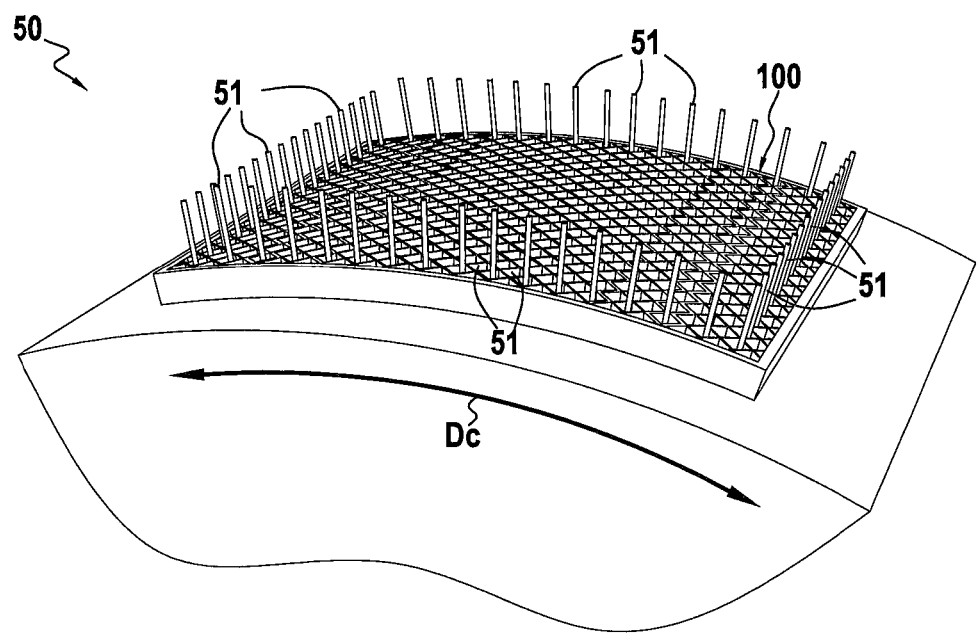
FIG. 4 is a diagrammatic perspective view showing the expansion of a fiber structure on shaper tooling.

As shown in FIG. 4, the impregnated fiber structure 100 is then expanded on support tooling 50 that presents a curved shape corresponding to the final shape of the cellular structure to be fabricated. In the presently-described example, the support tooling 50 is cylindrical in shape and has pegs 51 for holding the structure 100 in position on the tooling 50.

After the fiber structure 100 has been expanded and shaped on the tooling 50, the resin impregnating the fiber structure 100 is polymerized so as to impart a degree of mechanical strength thereto, enabling it to retain its shape during handling. This produces the cellular structure 10 shown in FIG. 1. When the fiber structure 100 has been impregnated with a ceramic-precursor resin, the cellular structure may be subjected, after polymerization, to pyrolysis treatment under an inert gas in order to transform the polymer matrix into a ceramic.

At this stage, the cellular structure still presents porosity, which porosity can be reduced to a determined level by well-known densification techniques such as chemical vapor infiltration (CVI), polymer impregnation and pyrolysis (PIP), or impregnation with a slurry (slurry cast), e.g. a slurry containing SiC and organic binders, followed by infiltration with liquid silicon (melt infiltration).

Figure 5B:
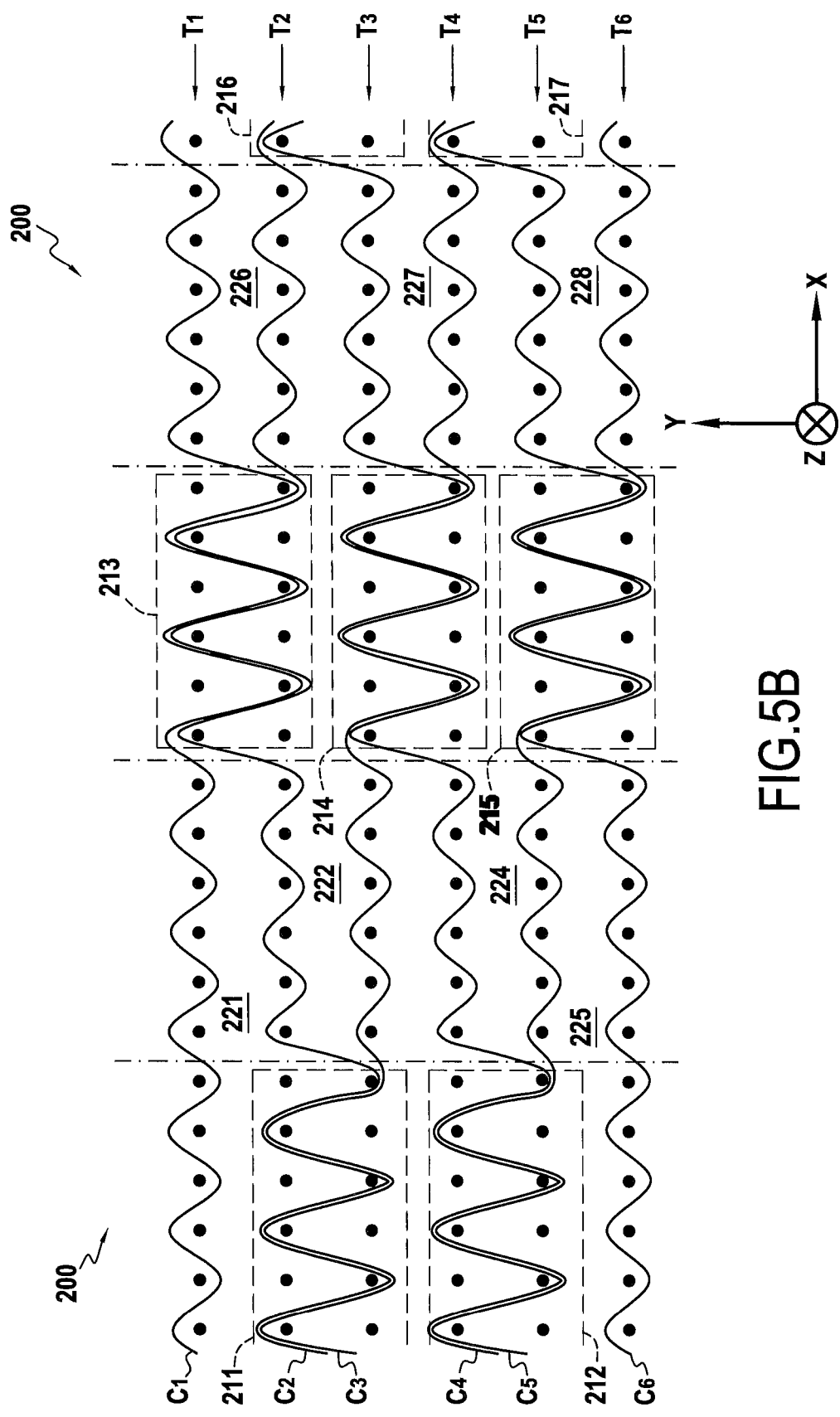
Figure 7A:
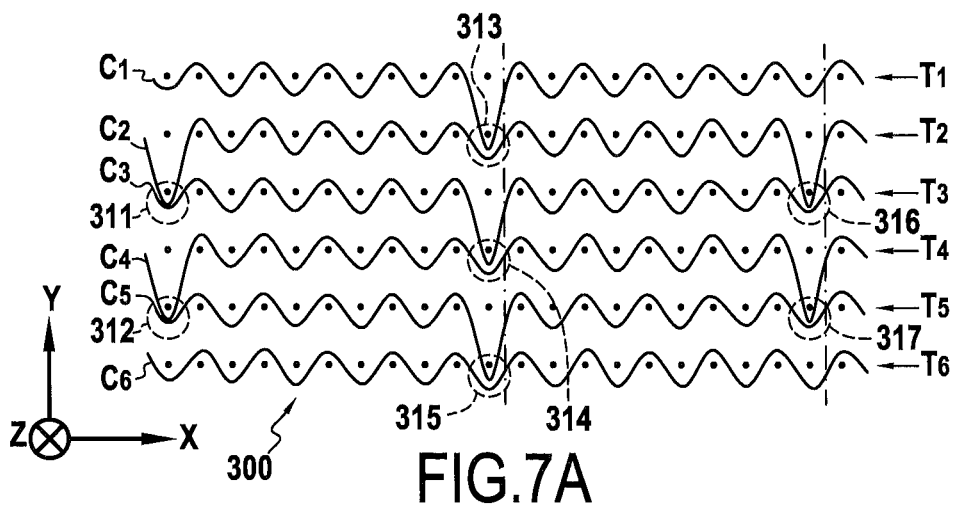
FIGS. 7A to 7L show weave planes suitable for making a fiber structure of the same type as the fiber structure of FIGS. 3A and 3B, but in which the weft and warp yarns are oriented at 45° relative to the axis of the cells in accordance with another implementation of the invention.
Figure 7B:
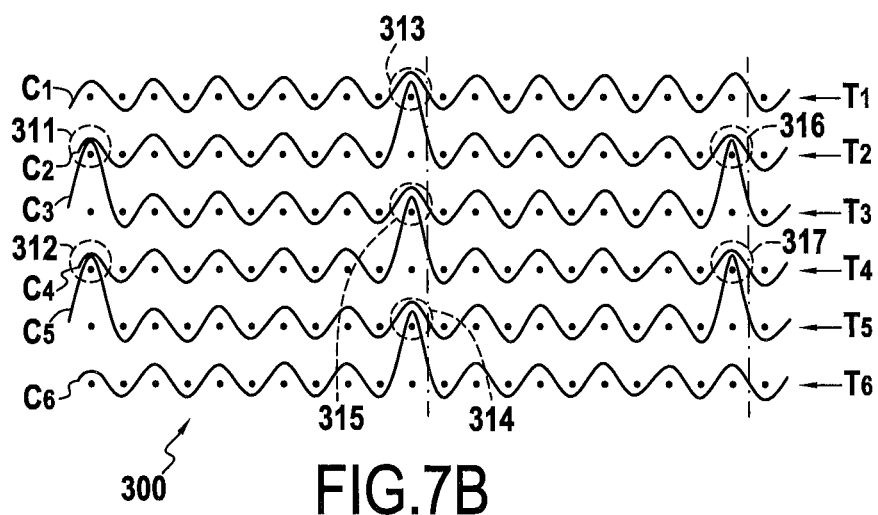
Figure 7C:
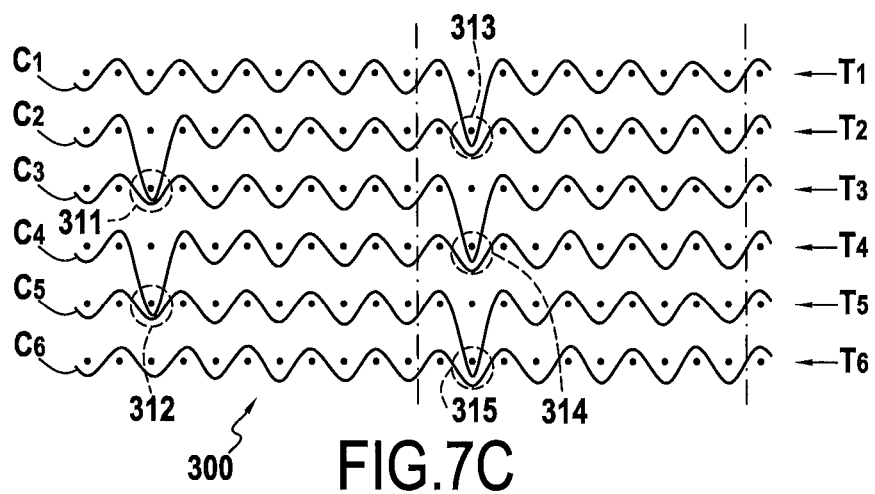
Figure 7D:
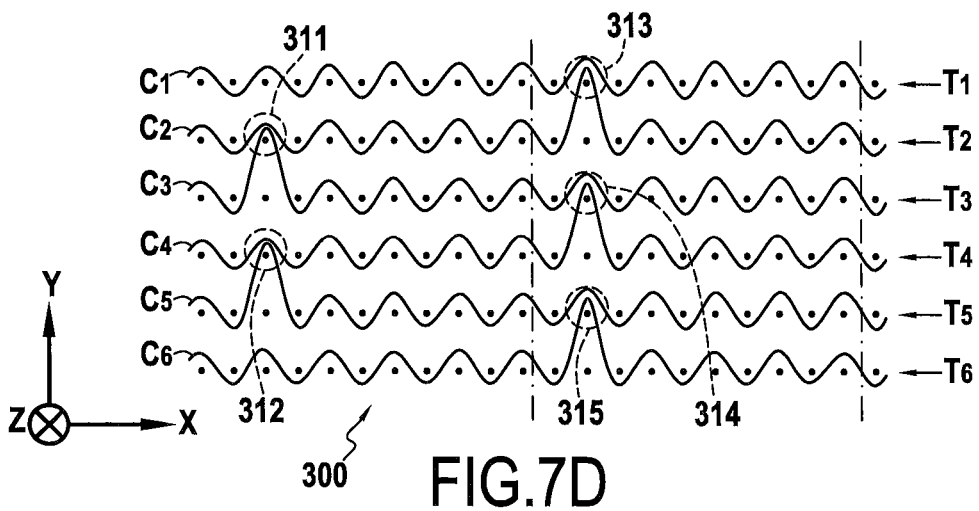
Figure 7E:
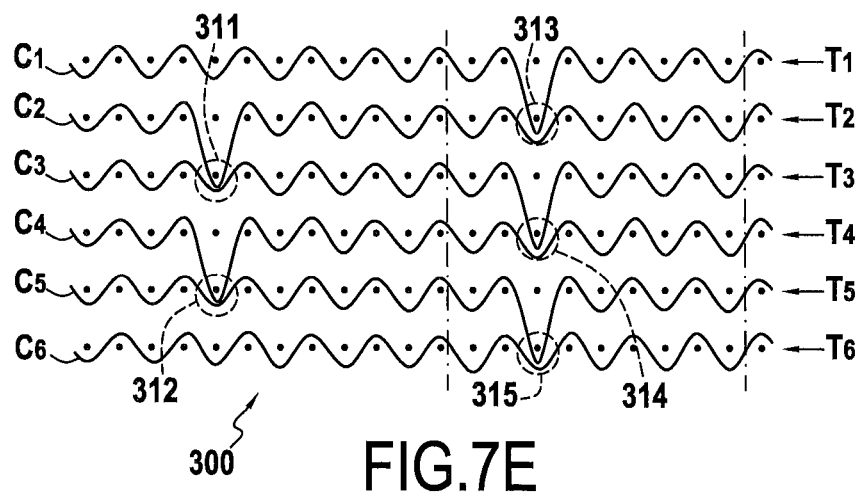
Figure 7F:
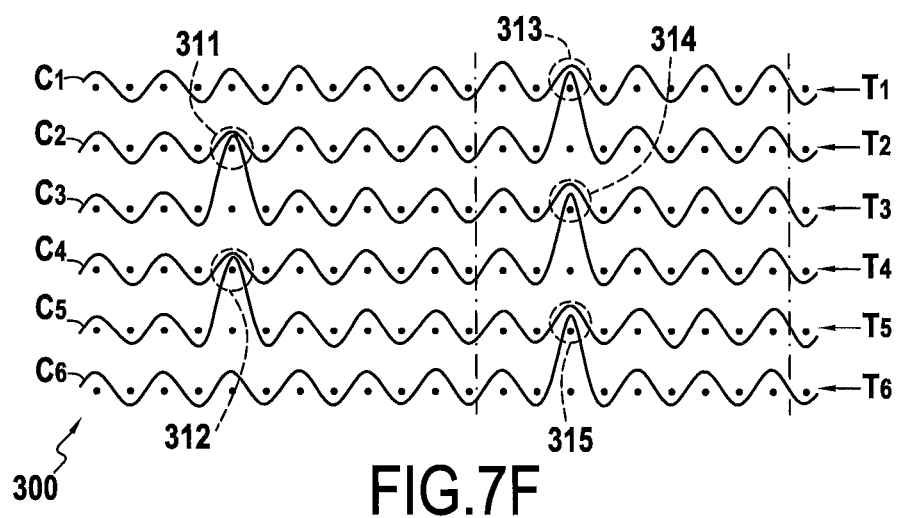
Figure 7G:
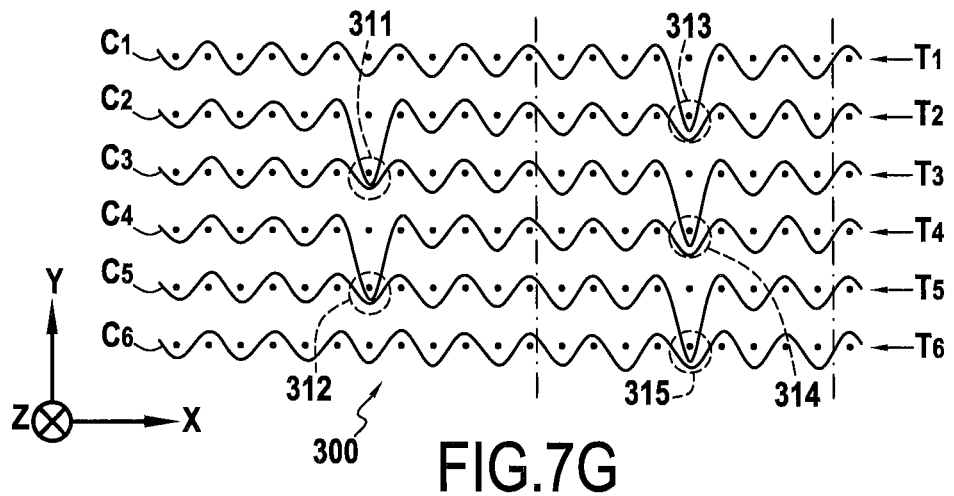
Figure 7H:
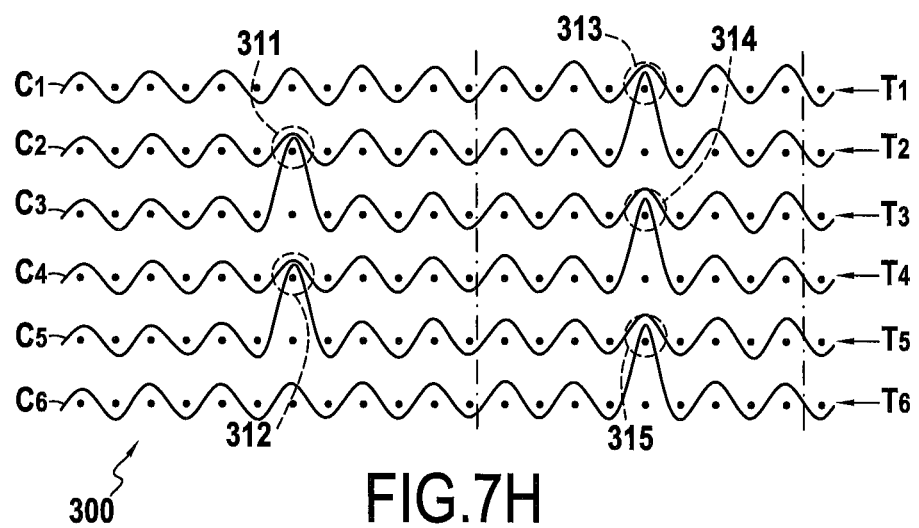
Figure 7I:
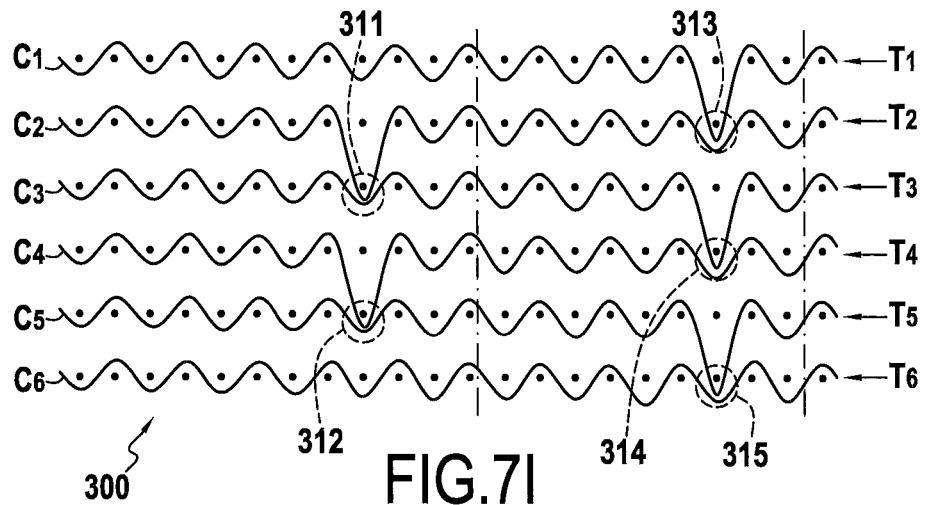
Figure 7J:
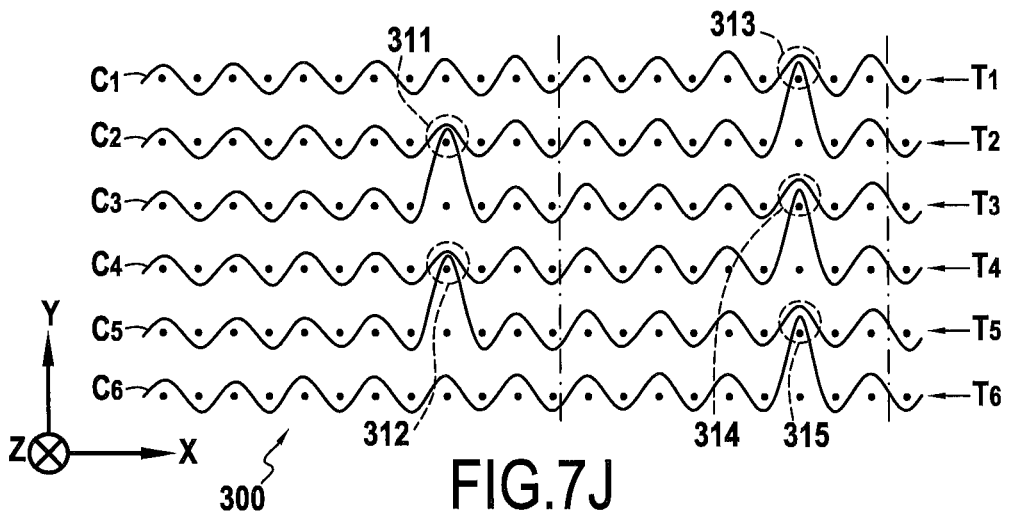
Figure 7K:
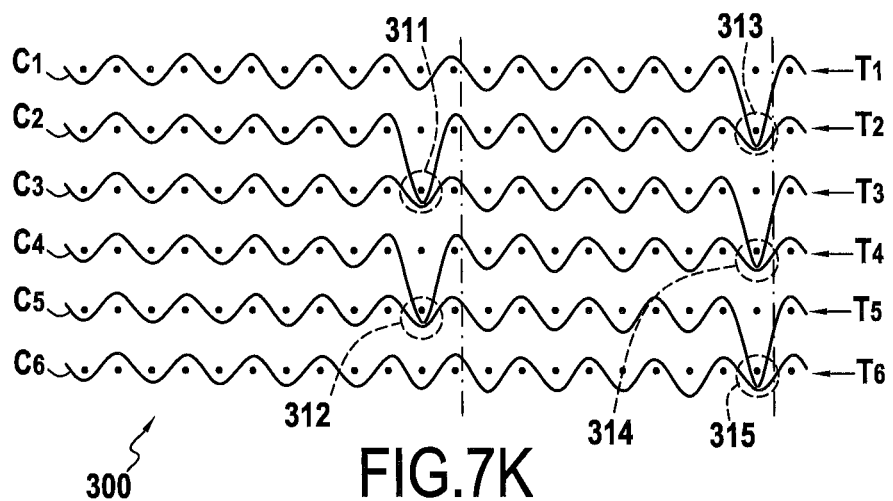
Figure 7L:
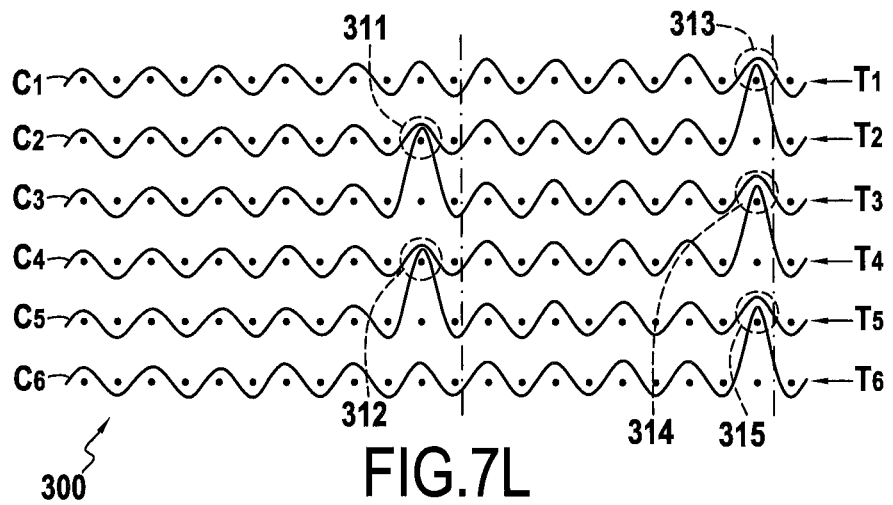
Figure 8C:
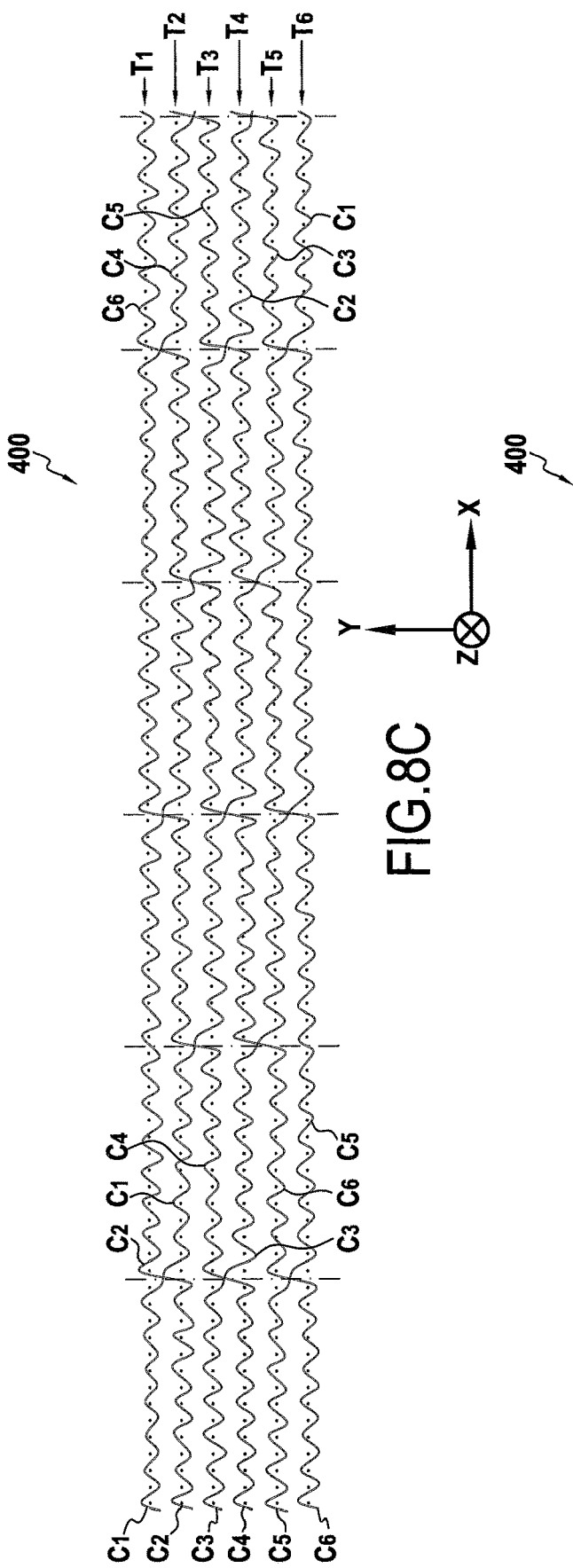
Figure 8D:
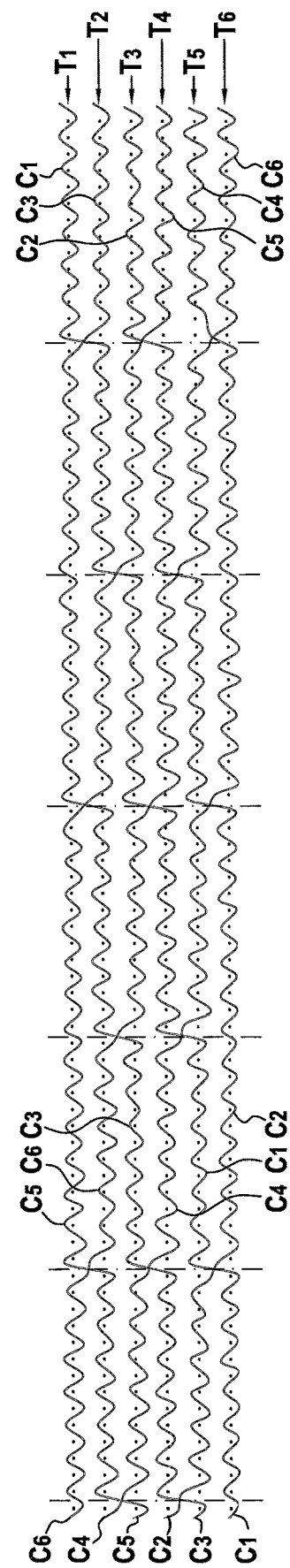
Figure 9A:
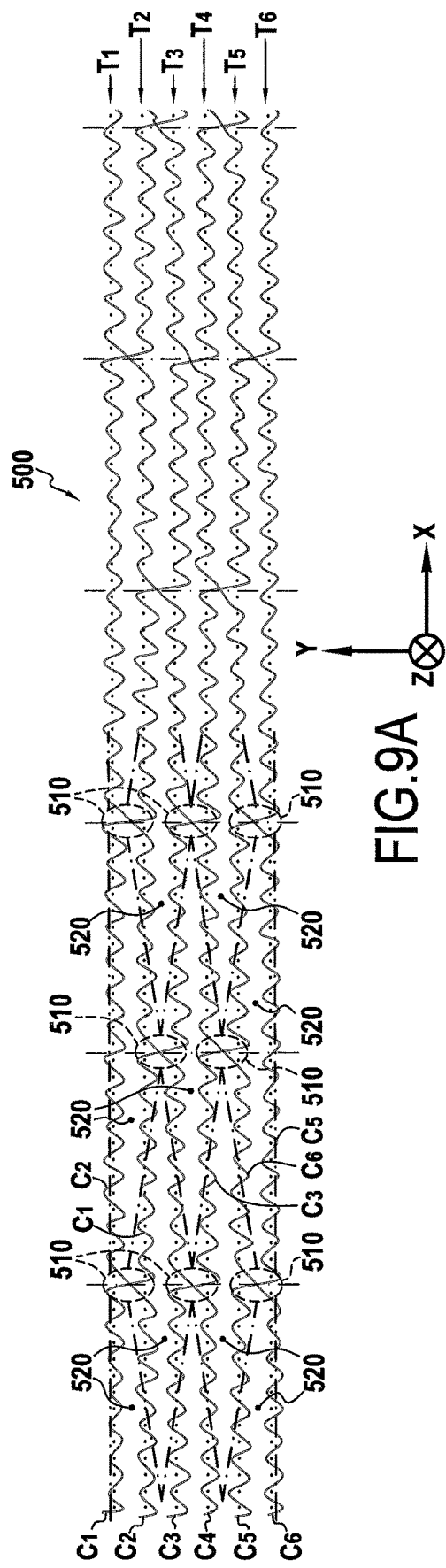
Figure 9B:
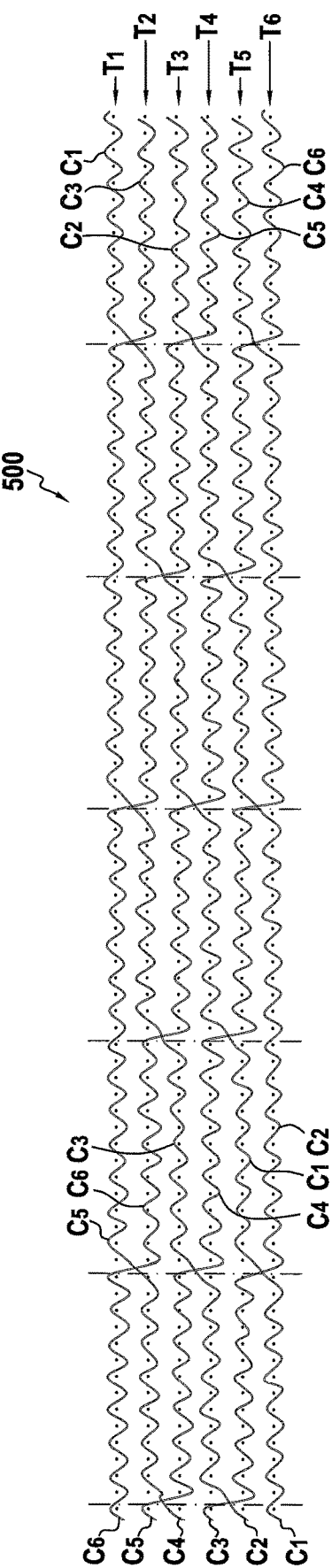
Figure 9C:
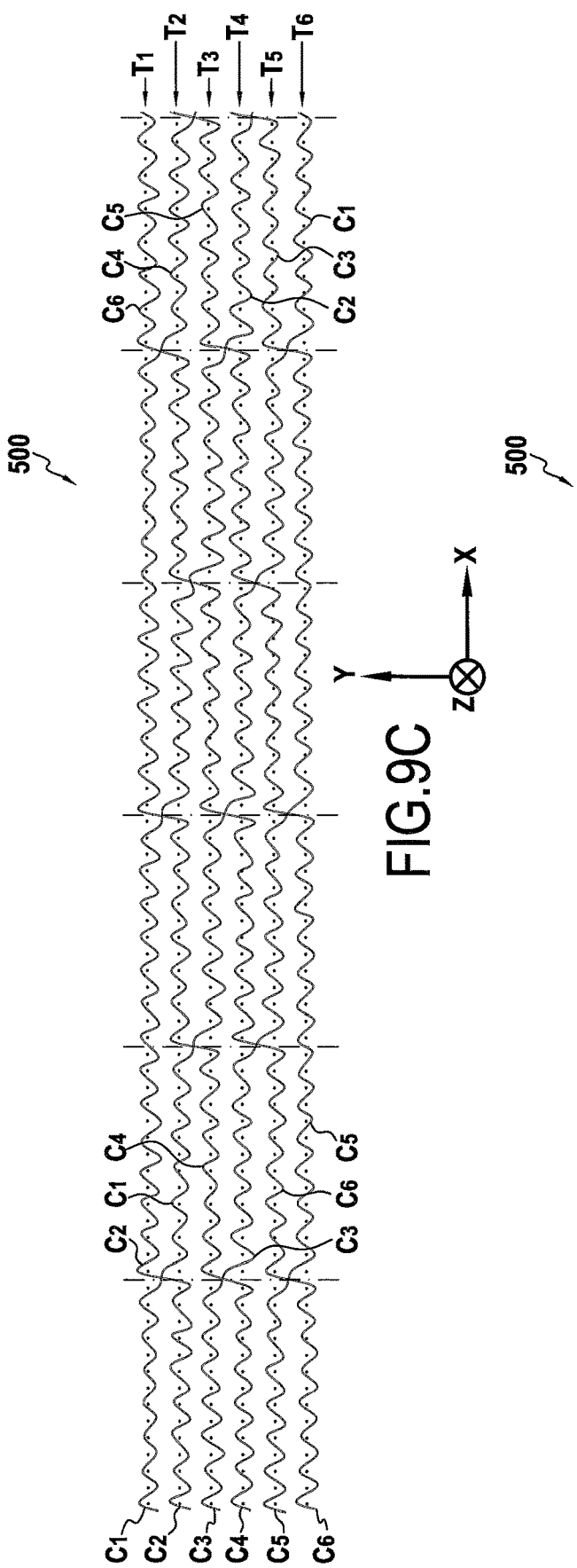
Figure 9D:
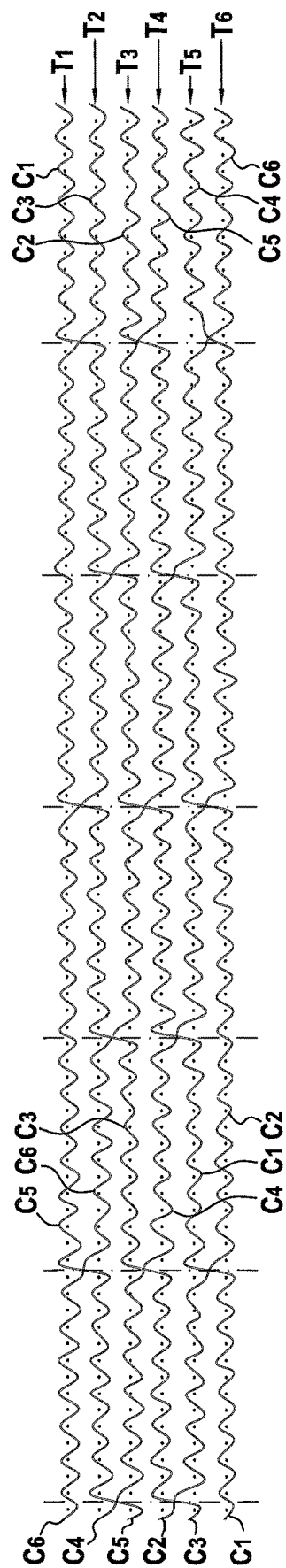
Figure 10A:
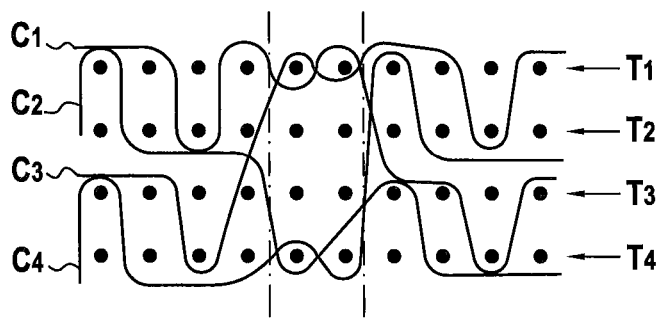
FIGS. 10A to 10D are fragmentary enlarged views of four successive planes of a weave making it possible to form an expandable fiber structure with cells having walls that are constituted by two layers of warp and weft yarns in accordance with another implementation of the invention.
Figure 10B:
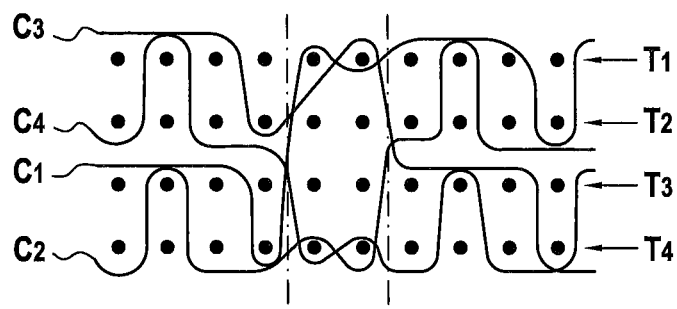
Figure 10C:
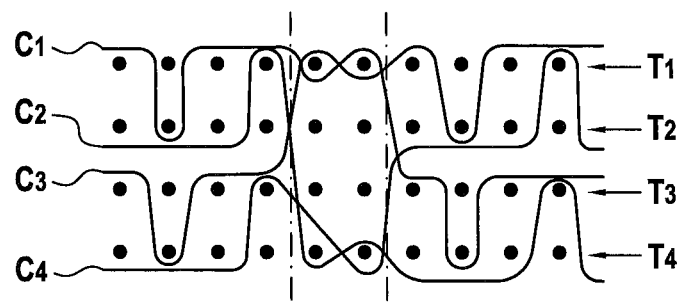
Figure 10D:
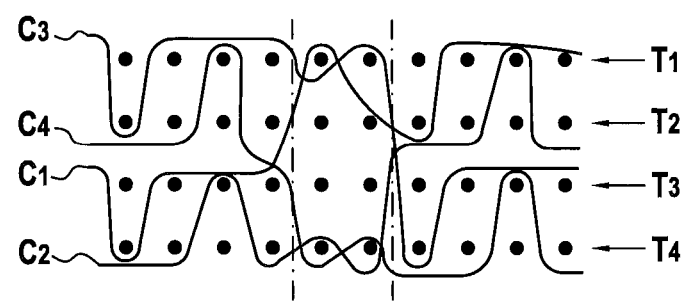

FIGS. 5A and 5B are respective enlarged views of two successive weave planes suitable for making a fiber structure 200 that, once expanded, forms cells that are hexagonal, the weft yarns being shown in section. In this example, the structure 200 has six layers of weft yarns T1 to T6 extending in the Z direction corresponding to the axis of the cells of the cellular structure. In FIGS. 5A and 5B, each layer of weft yarns is interlinked by warp yarns C1 to C6, each belonging to a respective layer of warp yarns. As for the above-described fiber structure 100, the thickness of the fiber structure 200, and consequently the height of the cells formed subsequently by expanding the structure, extends in the Z direction and is determined by the length of the weft yarns woven together by the warp yarns, i.e. the number of repetitions of the planes of FIGS. 5A and 5B. The length and the width of the structure 200 are defined respectively by the number of weft yarns per layer (X direction), and by the number of woven layers of warp yarns (Y direction).

Depending on the dimensions (width and thickness) of the fiber structure that it is desired to obtain, the structure may be made with numbers of warp yarn layers and of weft yarn layers that are greater, in particular in order to increase the number of cells in the Y direction of the fiber structure, while the number of weft yarns per layer can likewise be greater in order to increase the size of the cells in the X direction of the fiber structure.

Interlinking portions 211 to 217 are made between the yarns of two adjacent layers of weft yarns. These interlinking portions define zones of non-interlinking 221 to 228, each of which forms a cell once the fiber structure has been expanded.

The above-described fiber structures are woven with weft yarns parallel to the axis of the cells (0°) and with warp yarns perpendicular to the axis of the cells) (90°), as shown diagrammatically in FIG. 1, which shows the weft yarns 101 parallel to the Z axis of the cells 11 and warp yarns 102 perpendicular to the Z axis of the cells 11. Nevertheless, the weft yarns and the warp yarns could be oriented differently relative to the axis of the cells. When it is desired to have an orientation of the warp yarns and of the weft yarns that is different relative to the axis of the cells, i.e. weft yarns that are not parallel to the axis of the cells and warp yarns that are not perpendicular to the axis of the cells, then the interlinking portions are offset by one or more weft yarns in a direction parallel to the direction of the layers of weft yarns between each series of weave planes, the number of weft yarns by which the interlinking portions are offset being a function of the desired angle between the yarns and the axis of the cells.

Figure 6:
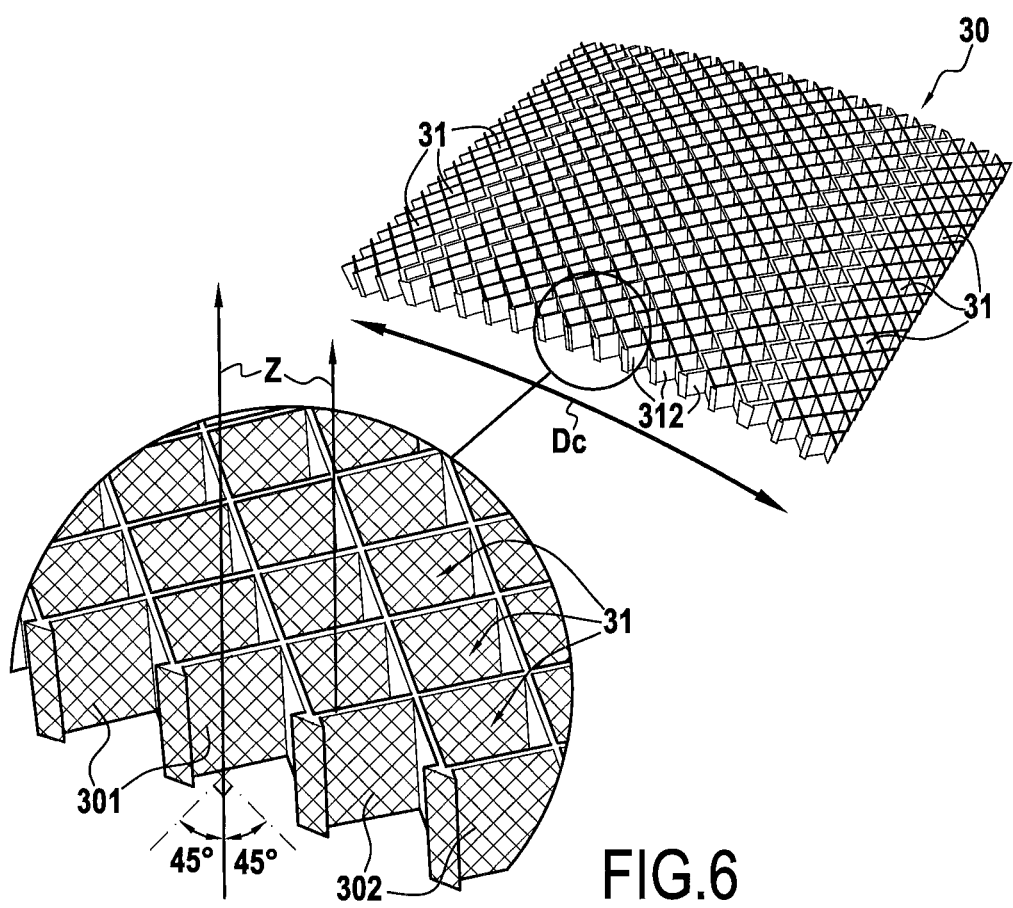
FIG. 6 is a diagrammatic perspective view of a curved cellular structure in which the weft and warp yarns are oriented at 45° relative to the axis of the cells in accordance with another implementation of the invention.

In a particular example, the fiber structures may be woven so that the weft and warp yarns are oriented at 45° relative to the axis of the cells, thereby enabling the fiber structure to be subjected to greater deformation while it is being expanded and thus enhancing good shaping on a warped surface. Such an orientation is shown diagrammatically in FIG. 6, which shows cells 31 of a cellular structure 30 in which walls 312 have weft yarns 301 and warp yarns 302 that are oriented at 45° relative to the axis of the cells 30.

FIGS. 7A to 7L show weave planes enabling a fiber structure 300 to be made of the same type as the above-described structure 100, i.e. a fiber structure suitable for forming lozenge-shaped cells, but in which the warp and weft yarns are oriented at 45° relative to the axis of each cell. The weaving of the fiber structure 300 differs from the weaving of the structure 100 in that the interlinking portions of two weft yarns are offset every two planes, in this example by two weft yarns, as shown for the interlinking portions 311 to 317 between FIGS. 7A and 7C, 7B and 7D, and 7C and 7E, etc.

The fiber structure for forming the reinforcement of the cellular structure of the invention may also be made by multilayer or interlock type 3D weaving. The term "interlock weaving" is used herein to mean a multilayer or 3D weave in which each warp layer interlinks a plurality of weft layers with all of the yarns in the same warp column having the same movement in the weave plane with warp yarn crossings in the weft layers.

FIGS. 8A to 8D are fragmentary views of two successive planes (two half-planes of a first plane in FIGS. 8A and 8B and two half-planes of a second plane in FIGS. 8C and 8D) of a weave for an expandable fiber structure 400 enabling lozenge-shaped cells to be formed, the structure being obtained by interlock 3D weaving, the weft yarns being visible in section. In the presently-described example, the structure 400 has six layers of weft yarns T1 to T6 with 168 weft yarns per layer extending in the Z direction corresponding to the axis of the cells of the cellular structure. In FIGS. 8A to 8D, each layer of weft yarns is crossed at least once by warp yarns C1 to C6, each belonging to a layer of warp yarns. Interlinking portions 410 are made between the yarns of two adjacent layers of weft yarns. Between them, these interlinking portions define zones of non-interlinking 420, each forming a cell once the fiber structure has been expanded.

The fiber structure 400 is woven with weft yarns parallel to the cell axis (0°), while the warp yarns are perpendicular to the cell axis (90°). FIGS. 9A to 9H are fragmentary views of four successive weave planes (two half-planes of a first plane in FIGS. 9A and 9B, two half-planes of a second plane in FIGS. 9C and 9D, and so on) thus making it possible to make a fiber structure 500 of the same type as the above-described structure 400, i.e. a fiber structure suitable for forming lozenge-shaped cells, but in which the weft and warp yarns are oriented at 45° relative to the axis of each cell. The weaving of the fiber structure 500 differs from the weaving of the structure 400 in that the interlinking portions of two weft yarns are offset every two planes, as shown for the interlinking portions 510 between FIGS. 9A and 9E, 9B and 9F, 9C and 9G, etc. Between them, these interlinking portions define zones of non-interlinking 520.

In another aspect of the invention, the thickness of the walls of the cells of the cellular structure can be adjusted as a function of the number of layers of weft yarns used for forming the cell walls. In the above-described examples of weaving expandable fiber structures, use is made of a single layer of weft yarns for forming the walls of the cells (except for the walls formed by the interlinking portions in FIGS. 5A and 5B). FIGS. 10A to 10D are enlarged fragmentary views of four successive planes of a weave (the weft yarns being visible in section) suitable for forming an expandable fiber structure having lozenge-shaped cells with walls that are constituted two layers of warp yarns and two adjacent layers of weft yarns, here the layers T1/T2 and T3/T4 that are interlinked by the warp yarns C1 to C4.

The cellular structure of the invention can be used in particular for making a sound attenuation panel. Under such circumstances, the cellular structure is generally arranged between a structural skin and a multiply-perforated acoustic skin. The shapes and the dimensions of these elements are defined as a function of the part on which the panel is to be mounted.

Such a sound attenuation panel may be used in general manner in any flow duct of a gas turbine. In particular, it may be fitted to various portions of an aeroengine nozzle such as the exhaust duct of a turbojet. It may also be used on the inside surface of an aeroengine nacelle in order to attenuate soundwaves that propagate from the engine core. The sound attenuation panel of the invention may also be used advantageously in thrust reversers of aeroengines, in particular with the scopes of such reversers.

Making a sound attenuation panel out of ceramic matrix composite material enables the weight of the part to be reduced, while ensuring its structural strength is maintained at high temperature (higher than 700° C.). In an exhaust system, for example, the use of sound attenuation panels made of CMC in the exhaust cone and in the nozzle make it possible to incorporate the sound attenuation function in the afterbodies of aeroengines without penalizing the weight of the ejection system.

The expandable fiber structure of the invention may be made directly at the scale of the cellular structure that is to be made, i.e. by using multilayer weaving as described above to weave a structure having dimensions that are adapted to form a single determined cellular structure, the dimensions of the expandable fiber structure possibly being adjusted by cuts made after impregnation, and possibly after drying or pre-curing of the structure.

In a variant implementation, a fiber substrate of large dimensions is made by multilayer weaving as described above. A plurality of expandable fiber structures, each for forming a cellular structure, are then cut out, after impregnation and possibly after drying or pre-curing, from the fiber substrate in the form of strips of the fiber substrate, each strip being cut out in particular with a determined width corresponding to the height of the cells that are to be made.

The invention claimed is:

1. A method of fabricating a curved cellular structure, the method comprising:
    making an expandable fiber structure having zones of non-interlinking extending in a thickness of the expandable fiber structure, the zones of non-interlinking being spaced apart from one another by portions of interlinking;
    impregnating the expandable fiber structure with a resin that is a precursor for a determined material;
    expanding the expandable fiber structure on a support tooling to form a cell in the expandable fiber structure at each zone of non-interlinking of the zones of non-interlinking, the support tooling presenting a curved shape corresponding to a shape of the curved cellular structure that is to be fabricated; and
    polymerizing the resin of the expandable fiber structure so as to form the curved cellular structure having a plurality of cells;
    wherein the expandable fiber structure is made by:
        multilayer weaving between a plurality of layers of warp yarns and a plurality of layers of weft yarns, and
        repeating a series of successive weave planes, each having portions of interlinking in which at least one warp yarn interlinks weft yarns from at least two adjacent layers of weft yarns, wherein the portions of interlinking are offset every two weave planes by two weft yarns in a direction parallel to the layers of weft yarns, the portions of interlinking at least partially forming the plurality of cells, and the plurality of warp yarns and the plurality of weft yarns being woven at an angle of 45-degrees relative to an axis of a cell of the plurality of cells such that each of the plurality of cells is substantially lozenge-shaped.

2. A method according to claim 1, wherein the expandable fiber structure is woven by repeating a series of two successive weave planes, each having interlinking portions in which at least one warp yarn interlinks weft yarns of at least two adjacent layers of weft yarns, and wherein the interlinking portions are offset by the two weft yarns in a first direction parallel to the layers of weft yarns between each series of weave planes so as to orient the warp yarns of the plurality of layers of warp yarns and the weft yarns of the plurality of layers of weft yarns in a second direction having the angle of 45° relative to axis of each cell of the plurality of cells that is substantially lozenge-shaped.

3. A method according to claim 1, wherein the expandable fiber structure is made by three-dimensional weaving by multilayer interlock weaving.

4. A method according to claim 1, wherein a wall thickness of each cell of the plurality of cells of the curved cellular structure that is to be fabricated is adjusted as a function of a number of layers of warp yarns woven in the portions of interlinking.

5. A method according to claim 1, wherein the expandable fiber structure is made of silicon carbide fibers.

6. A method according to claim 5, wherein the resin used for impregnating the expandable fiber structure is a ceramic-precursor resin.

7. A method according to claim 6, further comprising:
    pyrolyzing the resin in order to transform the resin into ceramic.

8. A method according to claim 7, further comprising:
    densifying the curved cellular structure.

9. A method according to claim 1, wherein, after the impregnating and before the expanding and polymerizing the expandable fiber structure, the method further comprises:
    cutting the expandable fiber structure to one or more determined dimensions of the curved cellular structure.

10. A method according to claim 1, further comprising:
    after impregnating the expandable fiber structure with the resin, cutting at least one strip from the expandable fiber structure to obtain the expandable fiber structure, each strip being cut out with a determined width corresponding to a height of the plurality of cells to be made.

11. A method according to claim 1, wherein the curved cellular structure is of a honeycomb type.

12. A method according to claim 11, wherein the curved cellular structure of the honeycomb type is formed such that the weft yarns and the warp yarns are non-severed.

13. A method according to claim 1, wherein each cell comprises four walls, and each wall comprises the plurality of warp yarns intersecting the plurality of weft yarns at a right angle.

14. A method according to claim 1, wherein:
    the multilayer weaving forms a plurality of weave planes comprising the two weave planes;
    the plurality of weft yarns are arranged in rows of weft yarns, each row being parallel to one another;
    in a first weave plane of the plurality of weave planes, each warp yarn of the plurality of warp yarns interlinks a weft yarn from a first row of the rows of weft yarns adjacent to a row of weft yarns with which the warp yarn is woven; and
    in a second weave plane of the plurality of weave planes, the second weave plane being woven subsequent to the first weave plane being woven, each warp yarn of the plurality of warp yarns interlinks a weft yarn of a second row of weft yarns adjacent to the row of weft yarns with which the warp yarn is woven and opposite the first row of the rows of weft yarns.

15. A method according to claim 1, wherein each layer of weft yarns is uniformly aligned along an axis perpendicular to the axis of the cells.

* * * * *